United States Patent [19]

Addison, Jr.

[11] 4,339,169

[45] Jul. 13, 1982

[54] REAR VIEW MIRROR AND WIPER ASSEMBLY FOR VEHICLES

[76] Inventor: Kenneith F. Addison, Jr., P.O. Box 27291, Tulsa, Okla. 74127

[21] Appl. No.: 119,668

[22] Filed: Feb. 8, 1980

[51] Int. Cl.$^3$ .............................. B60S 1/08; B60S 1/24
[52] U.S. Cl. ..................................... 350/61; 15/250.29
[58] Field of Search ................. 350/61, 302; 15/250.3, 15/250.29; 296/84 G, 84 B

[56] References Cited

U.S. PATENT DOCUMENTS

| 3,132,201 | 5/1964 | Bertell et al. | 350/61 |
| 3,526,920 | 9/1970 | Boyanich | 15/250.29 |
| 3,618,156 | 11/1971 | Riggs | 350/61 |
| 3,685,087 | 8/1972 | Pittman | 350/61 |
| 3,968,537 | 7/1976 | Wagenhofer | 15/250.29 |

FOREIGN PATENT DOCUMENTS

| 862903 | 12/1959 | United Kingdom | 15/250.29 |
| 1423172 | 1/1976 | United Kingdom | 15/250.29 |

*Primary Examiner*—Jon W. Henry
*Attorney, Agent, or Firm*—Shlesinger, Arkwright, Garvey & Dinsmore

[57] ABSTRACT

This invention is a rear view mirror and wiper assembly which is mounted externally of the vehicle. The assembly includes a power operated wiper blade which reciprocates transversely of the mirror surface to provide a continuous, clear field of view to the rear of the vehicle. A continuously operating motor actuates a rotating crank arm having an anti-friction bearing which is in rolling engagement with a mechanism fixedly engaged with a wiper blade in wiping engagement with the mirror surface. The mechanism includes a wiper-actuating arm which translates the rotary motion of the crank arm to reciprocating linear motion of the wiper blade.

10 Claims, 9 Drawing Figures

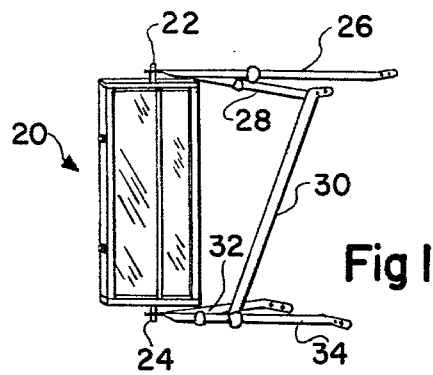
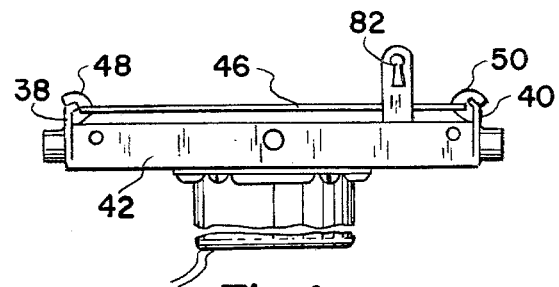
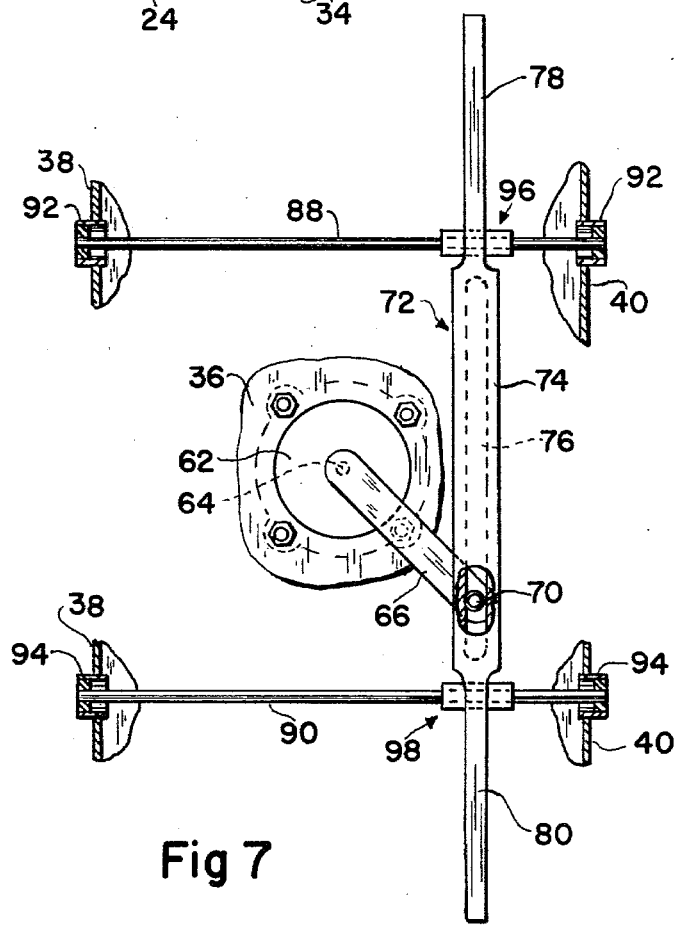
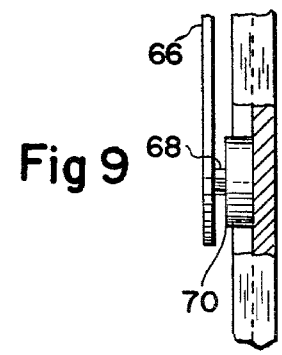
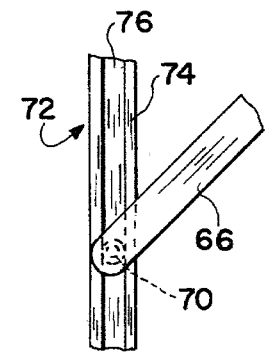
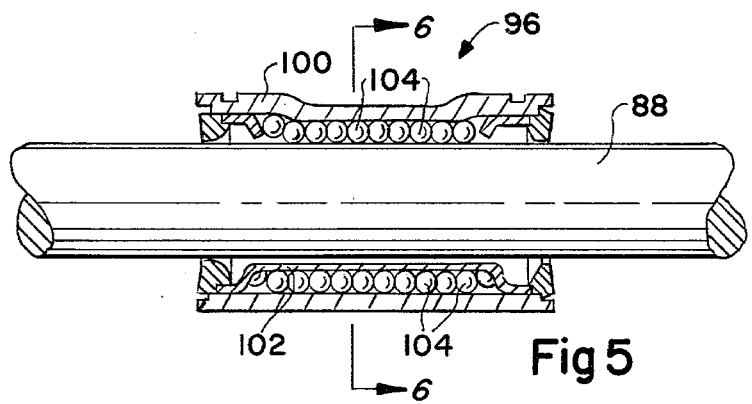
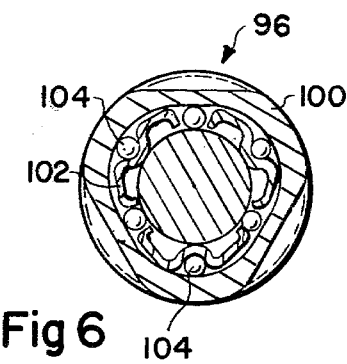

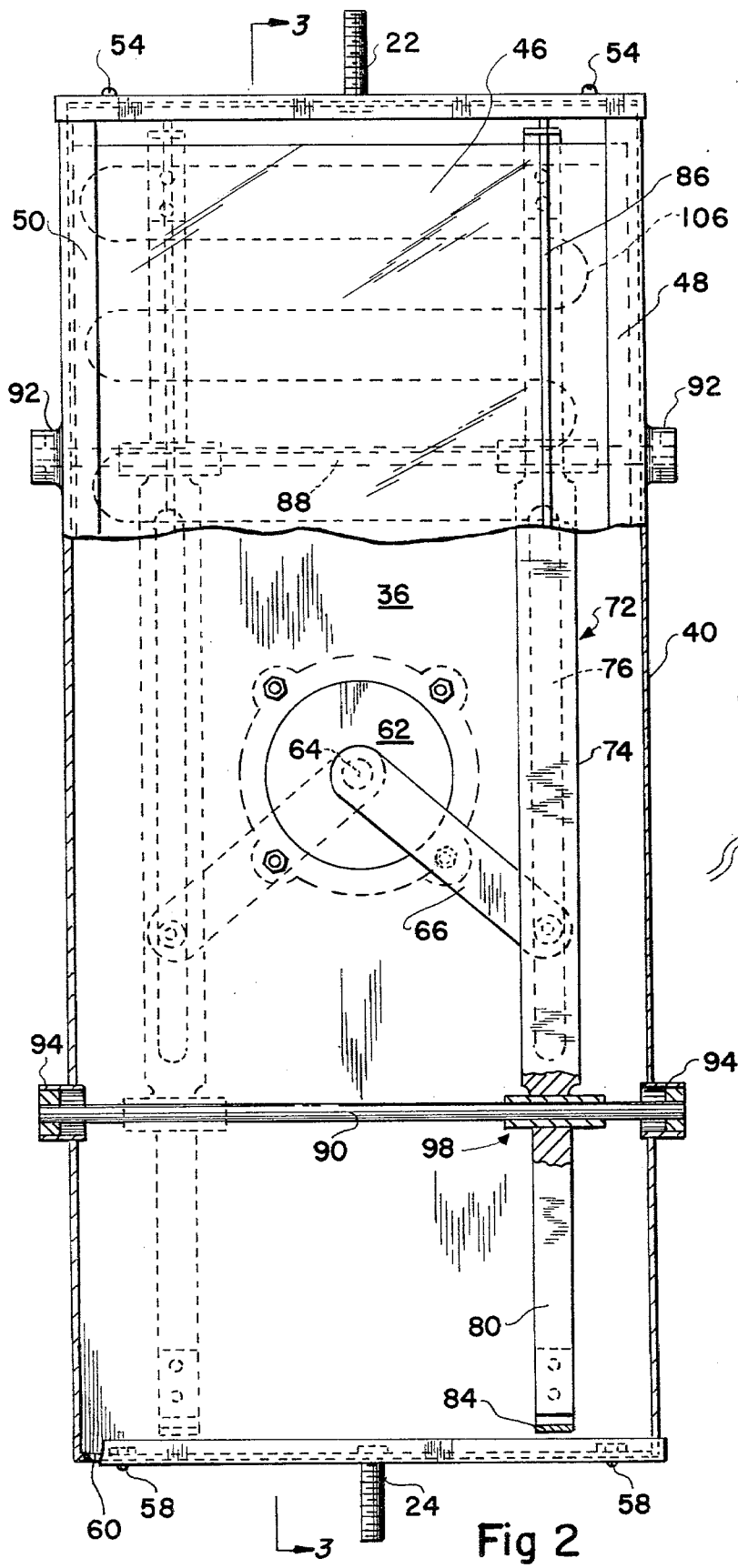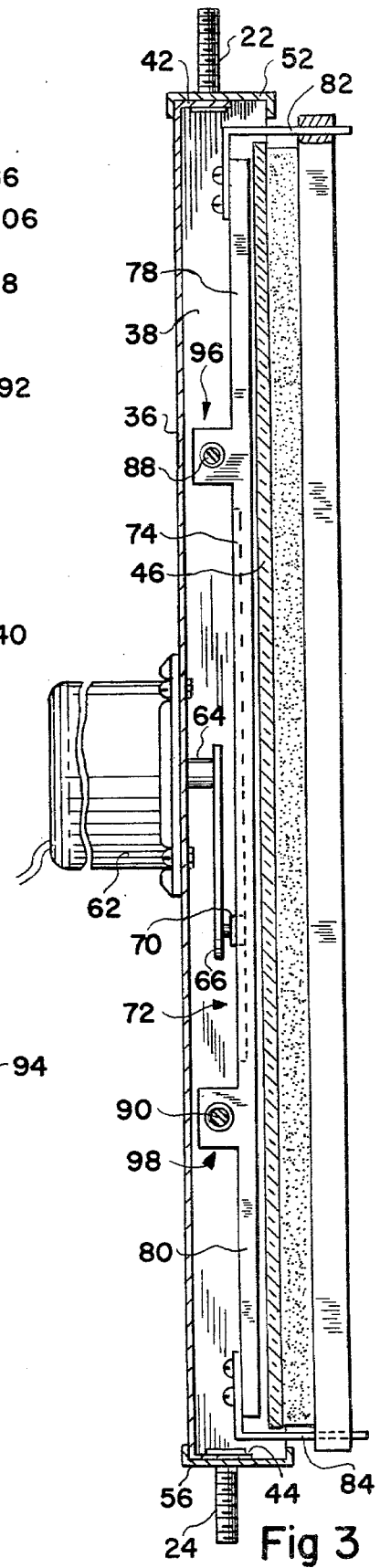

REAR VIEW MIRROR AND WIPER ASSEMBLY FOR VEHICLES

BACKGROUND OF THE INVENTION

Vehicles, and particularly trucks, are conventionally provided with externally mounted rear view mirrors of elongated, rectangular shape in order to afford maximum visibility of objects to the side and rear of the vehicle. Since these mirrors are exposed to the elements, precipitation collects on the mirror surface, thereby reducing the driver's visibility and establishing the need for a mirror wiper.

Conventional wipers, such as used for windshields, are unsatisfactory for this purpose, since they move in an arc and therefore can only clean a portion of an elongated, rectangular mirror. In recent years, power operated wiper blade assemblies have been developed wherein the wiper blade operates in a reciprocating linear motion across the mirror surface, cleaning off substantially all of the mirror surface. Assemblies of this type are illustrated in U.S. Pat. Nos. 3,526,920, 3,618,156, 3,968,537 and 4,037,286.

One problem which has occurred in the use of these assemblies is that a number of mechanical parts are necessary to carry out the linear wiping operation, the arrangement of which parts is such that the assemblies are bulky and cumbersome, and the appearance thereof has affected the adoption thereof as standard equipment for vehicles.

SUMMARY OF THE INVENTION

The present invention is a compact and efficient side mounted rear view mirror and wiper assembly for a vehicle, the assembly comprising a minimum of parts arranged in proximate relation to the mirror, presenting an aesthetically pleasing appearance. The assembly is designed to effect a reciprocating linear movement of a wiper blade over substantially the entire mirror surface so that there is a continuous, clear field of view of the side and rear of the vehicle regardless of weather conditions.

The assembly includes a power operated reduction motor, the output shaft of which is fixedly connected to one end of a crank arm for rotating the crank arm in a circular path. The opposite end of the crank arm is connected to a shaft and ball bearing which is in continuous rolling engagement with a scotch yoke type reciprocating arm having a wiper blade fixed thereto, the wiper blade being in wiping engagement with the mirror surface. Upon rotation of the crank arm, the rotational movement thereof is translated into transverse, reciprocating motion of the scotch yoke type arm to effect a corresponding movement of the wiper blade across the mirror surface.

Guide members extend transversely of the mirror in spaced parallel relationship, and the scotch yoke type arm is slidably mounted therein by means of anti-friction linear motion bearings to maintain the actuating arm and wiper blade in parallel relation to the longitudinal edges of the mirror while the actuating arm and wiper blade move transversely of the mirror.

DESCRIPTION OF THE FIGURES OF THE DRAWINGS

FIG. 1 is a front elevational view of the wiper assembly of the present invention, illustrating its use;

FIG. 2 is an enlarged front elevational view of the present assembly, portions thereof being broken away to disclose details of construction;

FIG. 3 is a sectional view taken along the line 3—3 of FIG. 2, looking in the direction of the arrows;

FIG. 4 is a bottom elevational view of the present assembly;

FIG. 5 is an enlarged sectional view of a linear motion bearing forming a part of the present invention;

FIG. 6 is a sectional view taken along the line 6—6 of FIG. 5, looking in the direction of the arrows;

FIG. 7 is a plan view of the mechanism for translating the rotary motion of the crank arm to reciprocating linear motion of the wiper blade, forming a part of the present invention;

FIG. 8 is an enlarged fragmentary front elevational view showing the manner of engagement of the crank arm with the wiper-actuating arm; and FIG. 9 is a fragmentary side elevational view of the reciprocating member and crank arm forming a part of the present invention.

DETAILED DESCRIPTION OF THE INVENTION

In FIG. 1, there is illustrated the mirror and wiper assembly of the present invention which is generally designated 20, having upper and lower mounting studs 22 and 24 to which are attached mounting bracket rods 26, 28, 30, 32 and 34, which are attached to the vehicle body in any suitable manner.

As shown to advantage in FIGS. 2, 3 and 4, mirror and wiper assembly 20 includes a frame member 36 of elongated, rectangular shape, the edges of which are bent at right angles to the frame member to provide side flanges 38 and 40, an upper flange 42 and a lower flange 44. A mirror 46 of substantially the same size as frame member 36 is positioned proximate one face of the frame member, and held in place by resilient mirror retainer members 48 and 50, made of rubber or other suitable resilient material, which are secured to side flanges 38 and 40, and are in frictional engagement with the longitudinal edges of the mirror to hold the same in place.

A top frame cover 52 of substantially U-shape cross section is engaged over upper flange 42, and is secured to the flange by screws 54 or other suitable securing means. Cover 52 is provided with a central opening through which upper mounting stud 22 extends for engagement with the mounting bracket rod. In similar fashion, a bottom frame cover 56 is placed over lower flange 44 and is secured thereto by suitable screws or the like 58. Bottom cover is also provided with a central opening through which the lower mounting stud 24 extends, and is additionally provided with a plurality of drain holes 60 through which drain water may pass.

In accordance with the principal objectives of the present invention, a conventional drive motor powered by vacuum, pneumatic pressure, hydraulic pressure or electro-motive force and operating through a reduction gear case, is indicated at 62, and is suitably mounted centrally of the outer face of frame member 36. The rotary shaft 64 of motor 62 extends through the frame member and is fixedly connected to a crank arm 66 which is rotated in circular motion by rotary shaft 64.

The free end of crank arm 66 is provided with a crank pin 68 having a rotatable ball bearing 70 extending therefrom into engagement with a reciprocating member generally designated 72 which is positioned between rear member 36 and mirror 46.

Reciprocating member 72 extends longitudinally of the mirror and frame member and includes a central scotch yoke type mechanism comprising an arm 74 having a longitudinal slot 76 therein into which ball bearing 70, rotatably mounted on one end of crank pin 68, extends, which ball bearing is adapted to roll longitudinally of the slot for effecting transverse movement of the reciprocating member upon rotation of the crank arm.

Slot 76 is slightly wider than the diameter of ball bearing 70 with the result that, when reciprocating member 72 is being urged to the left of the assembly, ball bearing 70 is in rolling contact only with that portion of the scotch yoke mechanism to the left of slot 76. Upon reaching the point where crank arm 66 is at a right angle to the reciprocating member, an imperceptible transfer takes place and the ball bearing then applies a force only to that portion of the scotch mechanism to the right of the slot 76. The slight clearance designed into slot 76 allows for this transition, and permits ball bearing 70 to roll, thereby eliminating friction at this point of engagement, and preventing binding of the ball bearing with the scotch yoke mechanism.

Beyond arm 74 there are provided upper and lower extensions 78 and 80 respectively which are connected to angular wiper blade retainer and drive brackets 82 and 84 which extend forwardly of mirror 46 and are in supporting engagement with a wiper blade 86 which is in contact under positive pressure with the surface of mirror 46.

In order to maintain reciprocating member 72 in parallel relation to the side edges of mirror 46 at all times, there are provided a pair of spaced parallel stationary guide shafts 88 and 90, the ends of which are mounted in elastic shaft mountings 92 and 94 respectively which are secured to side flanges 38 and 40 of frame member 36. Elastic shaft mountings 92 and 94 provide flexible, parallel alignment of the guide shafts under wide temperature variations and compensate for different coefficients of expansion of the various materials from which the parts are fabricated.

Interposed between reciprocating member 72 and guide shafts 88 and 90 are like linear motion bearings 96 and 98 which may be of a conventional type, such as a Thomson Series A ball bushing No. A4812.

As shown in FIGS. 5 and 6, each linear motion bearing 96 and 98 includes an outer housing 100, an inner cage 102 and a series of recirculating ball bearings 104, which elements are precision ground and hardened for providing anti-friction bearings between reciprocating member 72 and guide shafts 88 and 90. The anti-friction linear bearings and elastic mountings provide simple and effective means of maintaining positive alignment of the guide shafts and bearings even at great temperature extremes and provides a substantially friction free transport for the wiper blade, allowing it to work more efficiently and smoothly while resisting asymmetrical drag and reversing torque. This arrangement further permits the scotch yoke principle to be applied beyond the circumference of the rotating member.

As shown to advantage in FIG. 2, a heating strip 106 may be mounted on the rear face of mirror 46 and stretched back and forth across the length and breadth of the mirror, which strip is heated by a suitable electrical source for melting ice or snow from the mirror in cold weather.

OPERATION

In use of the present invention, the mirror assembly is employed in a conventional fashion by mounting units exteriorly of both sides of a vehicle with bracket rods 26, 28, 30, 32 and 34 secured to the vehicle chassis. Upon the onset of rain or other inclement weather, motor 62 is activated to cause rotation of shaft 64, and subsequent rotation of crank arm 66 in a circular motion about the motor shaft axis. By virtue of the engagement of ball bearing 70 in the longitudinal slot 76 of scotch yoke 74 of the reciprocating member, transverse movement of the reciprocating member 72 is effected in response to the rotary movement of crank arm 66.

Guide shafts 88 and 90 serve to maintain the reciprocating member parallel to the side edges of the mirror at all times during the movement of the reciprocating member, linear motion bearings 96 and 98 preventing any binding action between the reciprocating member and the guide shafts.

It will be noted that with the structural arrangement of the present invention, the operating mechanism controlling operation of the wiper blade, is located within the mirror frame behind the mirror, while the power means is located immediately behind the mirror case or frame. This affords a compact assembly similar in size to a conventional mirror assembly without a wiper.

The mounting arrangement of the present assembly represents a radical departure from the conventional "thru-bolt" method heretofore employed for attaching the mounting studs to the vehicle frame or chassis, and provides space within the mirror case for accomodating the mechanism for carrying out the objectives of this invention, thereby presenting a compact appearance.

While there has been herein shown and described the presently preferred form of this invention, it is to be understood that such has been done for purposes of illustration only, and that various changes may be made therein within the scope of the appended claims.

What is claimed is:

1. A rear view mirror and wiper assembly including
    (a) a frame member of elongated rectangular shape
    (b) a mirror of elongated rectangular shape
    (c) means for mounting said mirror in spaced adjacent relation to one face of said frame member
    (d) power means centrally mounted on the rear face of said frame member and having an output shaft extending through the frame member into the space between said frame member and mirror
    (e) a crank arm, one end of which is fixedly connected to said output shaft to effect circular motion of the crank arm
    (f) a ball bearing rotatably mounted on the opposite end of said crank arm
    (g) a reciprocating member extending longitudinally of said mirror and frame member and comprising a scotch yoke type mechanism including an arm having a longitudinal slot in which said ball bearing is mounted for effecting rolling engagement of the latter with the arm upon rotation of said crank arm
    (h) a wiper blade in wiping engagement with the outer face of said mirror
    (i) means connecting the ends of said wiper blade to the ends of said reciprocating member whereby, upon actuation of said power means, said arm is rotated and said reciprocating member and wiper blade are moved in a reciprocating transverse motion to effect wiping of the mirror (j) guide shafts extending transversely of said frame member and mirror in parallel spaced relationship and extending through the end portions of said reciprocating member, and (k) linear motion bearings interposed between said guide shafts and reciprocating member for facilitating transverse movement of the latter.

2. The rear view mirror and wiper assembly of claim 1, wherein (a) said crank arm, ball bearing, reciprocating member and guide shafts are located in the space between said frame member and mirror.

3. The rear view mirror and wiper assembly of claim 2, with the addition of (a) elastic shaft mountings in which the ends of said guide shafts are positioned.

4. The rear view mirror and wiper assemble of claim 1, wherein:

(a) Said reciprocating member and wiper blade are vertically disposed and reciprocate in a horizontal plane.

5. The rear view mirror and wiper assembly of claim 1, wherein (a) said guide shafts extend transversely of said frame member at points proximate the upper and lower limits of the circular path described by said crank arm.

6. A rear view mirror and wiper assembly including (a) frame means having a mirror mounted thereon, said frame means and mirror being of substantially rectangular shape (b) power means having an output shaft mounted on said frame means (c) an arm, one end of which is fixedly connected to said output shaft to effect circular movement of the arm (d) a reciprocating member movably mounted on said frame means for transverse movement with respect to the latter (e) said reciprocating member including an elongated arm having a longitudinal slot therein (f) means carried by the opposite end of said arm connected to the output shaft and located in the longitudinal slot in rolling engagement with said elongated arm (g) guide means carried by said frame means engaged with said reciprocating member for maintaining the latter in substantially parallel relation to the side edges of said frame means and mirror (h) said guide means including spaced, parallel shafts extending transversely of said frame means and mirror (i) said reciprocating member being movably mounted on said shafts (j) anti-friction means interposed between said shafts and reciprocating member to facilitate transverse movement of the latter, and (k) a wiper blade mounted on said reciprocating member and in continuous wiping engagement with the surface of the mirror whereby, upon actuation of said power means, said arm fixedly connected thereto is rotated and said reciprocating member and wiper blade are moved in a reciprocating transverse motion to effect wiping of the mirror.

7. The rear view mirror and wiper assembly of claim 6, wherein (a) said power means is a reduction gear motor.

8. The rear view mirror and wiper assembly of claim 6, wherein (a) said means carried by the opposite end of said arm connected to the output shaft of said power means comprises a ball bearing rotatably mounted on said arm.

9. The rear view mirror and wiper assembly of claim 6, wherein (a) said anti-friction means interposed between said shafts and reciprocating member comprise linear motion bearings.

10. The rear view mirror and wiper assembly of claim 6, wherein (a) said spaced, parallel shafts comprising guide means for said reciprocating member are located proximate the upper and lower limits of the circular path described by said arm connected to said power means.

* * * * *